United States Patent
Bedingfield, Sr. et al.

(10) Patent No.: US 8,484,296 B2
(45) Date of Patent: Jul. 9, 2013

(54) SYSTEMS AND METHODS FOR DISPLAYING ELECTRONIC MAIL MESSAGES

(75) Inventors: James Carlton Bedingfield, Sr., Lilburn, GA (US); David Alberto Levine, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 550 days.

(21) Appl. No.: 11/561,189

(22) Filed: Nov. 17, 2006

(65) Prior Publication Data
US 2008/0120556 A1 May 22, 2008

(51) Int. Cl.
*G06F 15/16* (2006.01)

(52) U.S. Cl.
USPC ............................ 709/206; 715/700; 715/752

(58) Field of Classification Search
USPC .......................................................... 709/206
See application file for complete search history.

(56) References Cited

U.S. PATENT DOCUMENTS

| | | | | |
|---|---|---|---|---|
| 6,393,464 B1* | 5/2002 | Dieterman | | 709/206 |
| 6,615,241 B1* | 9/2003 | Miller et al. | | 709/206 |
| 6,684,238 B1* | 1/2004 | Dutta | | 709/206 |
| 7,120,671 B2* | 10/2006 | Gusler et al. | | 709/206 |
| 7,237,010 B2* | 6/2007 | Mora | | 709/206 |
| 7,275,214 B2* | 9/2007 | Itoh | | 715/752 |
| 7,912,913 B2* | 3/2011 | Accapadi et al. | | 709/207 |
| 2002/0065891 A1* | 5/2002 | Malik | | 709/206 |
| 2002/0133555 A1* | 9/2002 | Hall et al. | | 709/206 |
| 2003/0115279 A1* | 6/2003 | Quine et al. | | 709/207 |
| 2003/0233418 A1* | 12/2003 | Goldman | | 709/206 |
| 2004/0181581 A1* | 9/2004 | Kosco | | 709/206 |
| 2004/0193692 A1* | 9/2004 | Bottan et al. | | 709/207 |
| 2005/0097319 A1* | 5/2005 | Zhu et al. | | 713/166 |
| 2005/0132066 A1* | 6/2005 | Heilmann | | 709/228 |
| 2005/0144245 A1* | 6/2005 | Lowe | | 709/206 |
| 2005/0188043 A1* | 8/2005 | Cortright et al. | | 709/206 |
| 2005/0198143 A1* | 9/2005 | Moody et al. | | 709/206 |
| 2005/0223063 A1* | 10/2005 | Chang et al. | | 709/206 |
| 2005/0278430 A1* | 12/2005 | Cato | | 709/206 |
| 2007/0067394 A1* | 3/2007 | Adams et al. | | 709/206 |
| 2007/0239834 A1* | 10/2007 | Ji et al. | | 709/206 |
| 2007/0294428 A1* | 12/2007 | Guy et al. | | 709/245 |

OTHER PUBLICATIONS

MacWan; U.S. Patent Application Entitled: Messaging Personalization, filed Dec. 23, 2008, having U.S. Appl. No. 12/342,395.

(Continued)

*Primary Examiner* — Linglan Edwards
(74) *Attorney, Agent, or Firm* — Wolff & Samson, PC

(57) ABSTRACT

Systems and methods for displaying an e-mail message are disclosed. In one embodiment, a method includes the act of classifying at least one recipient as trusted or suspect. The recipient is specified by the e-mail message. The method also includes the act of displaying the at least one recipient using a first visual cue if the classification is suspect. The method also includes the act of displaying the at least one recipient using a second visual cue if the classification is trusted. In one embodiment, a system includes a means for classifying at least one recipient as trusted or suspect, and an e-mail message display window. The recipient is specified by the e-mail message. The window is configured to display the at least one recipient using a first visual cue if the classification is suspect. The window is configured to display the recipient using a second visual cue if the classification is trusted.

18 Claims, 11 Drawing Sheets

OTHER PUBLICATIONS

Macwan; Non-Final Office Action mailed Jan. 13, 2011 for U.S. Appl. No. 121342,395, filed Dec. 23, 2008.

MacWan; Final Office Action mailed Jun. 10, 2011 for U.S. Appl. No. 12/342,395, filed Dec. 23, 2008.

MacWan; Final Office Action mailed Feb. 21, 2012 for U.S. Appl. No. 12/342,395, filed Dec. 23, 2008.

MacWan; Notice of Allowance mailed Jun. 8, 2012 for U.S. Appl. No. 12/342,395, filed Dec. 23, 2008.

MacWan; Non-Final Office Action mailed Sep. 28, 2011 for U.S. Appl. No. 12/342,395, filed Dec. 23, 2008.

* cited by examiner

FIG. 6A

ADDRESS DATABASE 160

| USERNAME 610 | DOMAIN 620 | CLASSIFICATION 630 |
|---|---|---|
| * | FOO.COM | TRUSTED |
| * | SUPPORT.FOO.COM | SUSPECT |
| Jane.Doe | FOO.COM | SUSPECT |

ADDRESS DATABASE 160

| USERNAME 610 | DOMAIN 620 | EMPLOYEE STATUS 670 | CLASSIFICATION 630 |
|---|---|---|---|
| * | FOO.COM | CONTRACTOR | SUSPECT |
| * | FOO.COM | EMPLOYEE | TRUSTED |
| * | SUPPORT.FOO.CO | | SUSPECT |

680
690

SYSTEMS AND METHODS FOR DISPLAYING ELECTRONIC MAIL MESSAGES

CROSS REFERENCE TO RELATED APPLICATIONS

Not applicable.

FIELD OF THE DISCLOSURE

The present disclosure relates to electronic mail (e-mail) systems, and more specifically, to systems and methods for displaying e-mail messages.

BACKGROUND

Electronic mail, or e-mail, is routinely used for both personal and corporate communication. When sending an e-mail message to a group of recipients, the sender often has only limited information about the identity of these recipients. For example, the sender may not be aware of the corporate affiliation or the geographic location of the recipients. This is very common when "friendly names" are used in e-mail addresses, so that a user sees "John Doe" in a list rather than "john.doe@foo.com." The problem is also made worse by the use of the "Reply to All" feature of many e-mail software programs, which allows a user to choose a group of recipients with one action, rather than choosing each one.

A sender might prefer to treat some recipients as "trusted" and others as "suspect." For example, a corporate employee sending an e-mail message may change the message contents if the message will be received outside the company. However, conventional e-mail software programs do not readily provide this information to the user. Therefore, a need arises for these and other problems to be addressed.

SUMMARY

Embodiments of the present invention include a system for displaying a electronic mail messages having at least one recipient. The system includes a means for classifying at least one recipient, specified by the e-mail message, as trusted or suspect. The system further includes an e-mail message display window. The display window is configured to display the at least one recipient using a first visual cue if the classification is suspect. The display window is configured to display the recipient using a second visual cue if the classification is trusted.

The systems can also be viewed as providing methods for displaying an e-mail message having at least one recipient. In this regard, embodiments of the method can be broadly summarized by the following acts: classifying at least one recipient, specified by the e-mail message, as trusted or suspect; displaying the at least one recipient using a first visual cue if the classification is suspect; and displaying the at least one recipient using a second visual cue if the classification is trusted.

The system can also be viewed as a computer-readable medium containing instructions for performing a method of displaying an e-mail message having at least one recipient. In this regard, embodiments of the method can be broadly summarized by the following acts: classifying at least one recipient, specified by the e-mail message, as trusted or suspect; displaying the at least one recipient using a first visual cue if the classification is suspect; and displaying the at least one recipient using a second visual cue if the classification is trusted.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 6A is a schema diagram of one embodiment of the address database of FIG. 1 used by the process of FIG. 4.

FIG. 6B is a schema diagram of another embodiment of the address database of FIG. 1 used by the process of FIG. 5.

DETAILED DESCRIPTION

Figure 1:
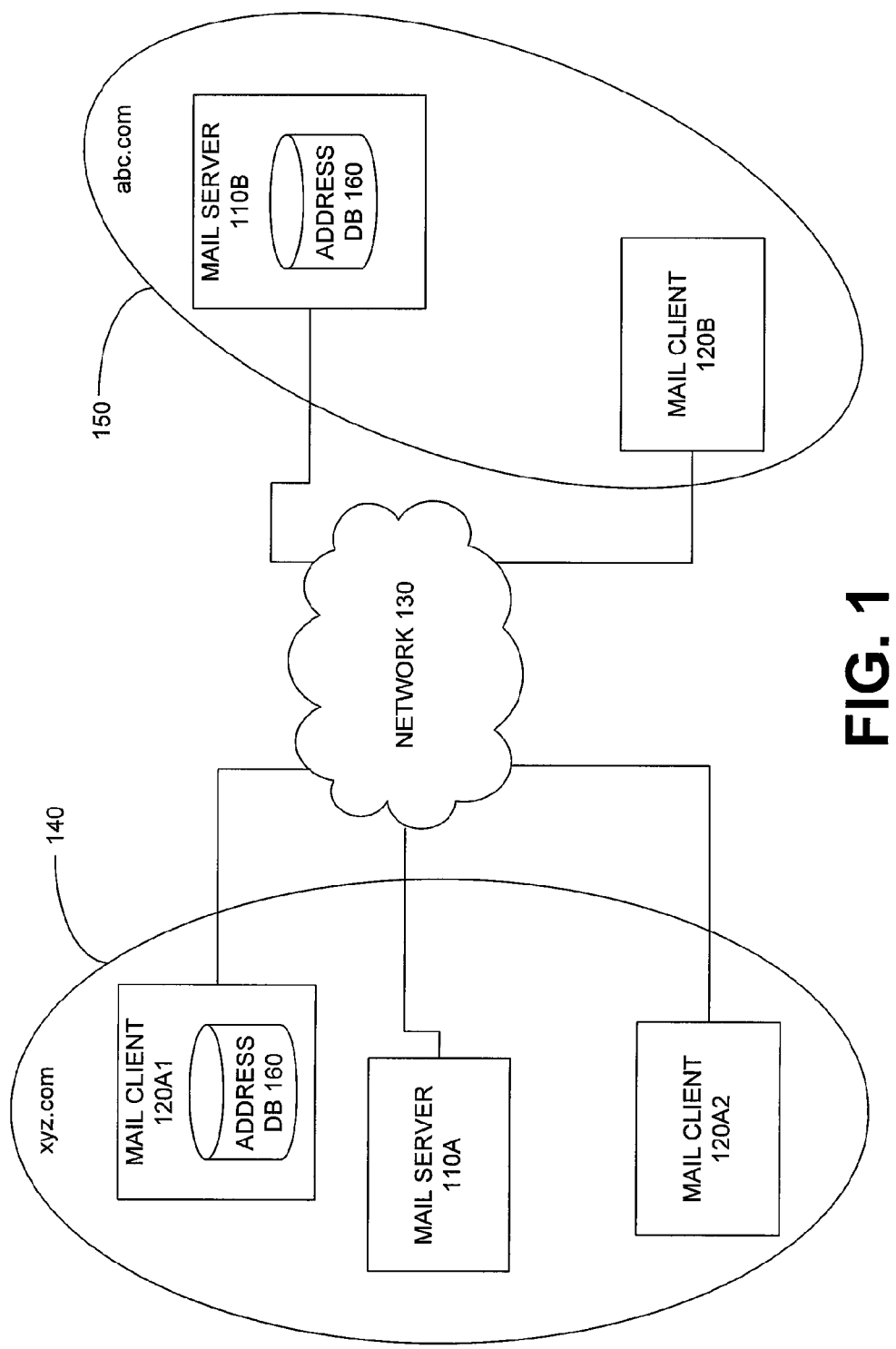
FIG. 1 is a block diagram of an environment in which one embodiment of a system and method for displaying electronic mail messages is located.

FIG. 1 is a block diagram of an environment in which one embodiment of a system and method for displaying electronic mail messages is located. In an exemplary embodiment, two mail servers (110A and 110B) and three mail clients (120A1, 120A2, 120B) communicate over a network 130. The mail server 110A and the mail clients 120A1 and 120A2 reside in one domain (140), while the mail server 110B and the mail client 120B reside in another domain (150). In the example of FIG. 1, the domain 140 corresponds to "xyz.com" and the domain 150 corresponds to "abc.com".

The mail server 110A provides electronic mail (e-mail) services to the mail clients 120A1 and 120A2, allowing the clients 120A1 and 120A2 to send e-mail messages to, and receive e-mail messages from, other mail clients. This includes intra-domain messaging, such as the mail client 120A1 sending an e-mail message to the mail client 120A2, and inter-domain messaging, such as the mail client 120A1 receiving an e-mail message from the mail client 120B. The mail server 110B provides similar e-mail services to the mail client 120B.

An optional address database 160 may reside in a mail client (e.g., client 120A1) or a mail server (e.g., server 110B). The address database 160 is also known as an address book or a contacts database. In one embodiment, the address database 160 contains e-mail addresses and "friendly names" for the addresses (e.g., "Brother John" for john.doe@foo.com). In another embodiment, the address database 160 contains additional information about the "contact" associated with the e-mail address, for example, phone number, mailing address, company name, etc. In yet another embodiment, the address database 160 is linked to an enterprise database to provide even more information about a contact.

Delivery of intra-domain e-mail messages can be accomplished with a single mail server, the mail server for the domain. For example, the mail client 120A1 sends an e-mail message to the mail client 120A2 by sending the message to the mail server 110A, the mail server for xyz.com. The mail client 120B then retrieves the message from the mail server 110A.

Mail servers communicate with each other to deliver inter-domain e-mail messages. For example, an e-mail message from the mail client 120B in abc.com to the mail client 120A2 in xyz.com is accomplished as follow. The e-mail message is communicated first from the mail client 120B to the local mail server for abc.com (the mail server 110B), then to the mail server for xyz.com (the mail server 110A), then to the recipient in xyz.com (the mail client 120A2). According to exemplary embodiments, SMTP (Simple Mail Transfer Protocol) is used for communication between mail servers, and POP (Post Office Protocol) or IMAP (Internet Mail Access Protocol) is used for communication between mail clients and a mail server. However, a person of ordinary skill in the art should understand that the principles described herein are applicable to other e-mail protocols as well.

Figure 2:
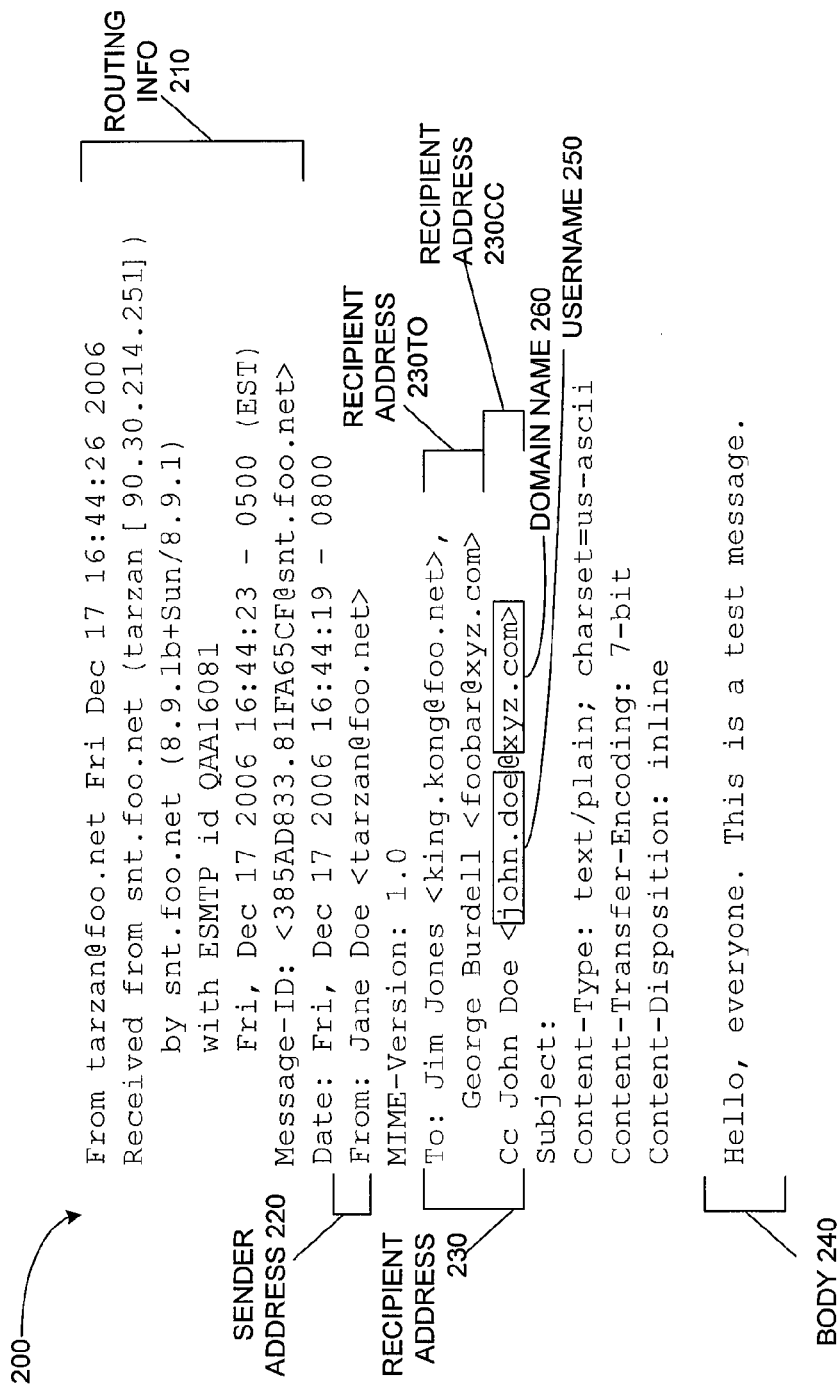
FIG. 2 is a diagram of a SMTP e-mail message, showing its constituent parts.

FIG. 2 is a diagram of a SMTP e-mail message, showing its constituent parts. A message 200 may include routing information 210, a sender address 220, a list of recipient addresses 230, and a text body 240. The SMTP message format uses a comma to separate recipients in a list, but other variations are possible.

The recipient addresses 230 can be categorized as a direct recipient (230TO), a carbon-copy recipient (230CC), or a blind-carbon-copy recipient (not shown). Each message has at least one recipient (direct, carbon-copy or blind-carbon-copy); additional recipients are optional. As used herein, the term "recipient" applies to direct, carbon-copy and blind-carbon-copy recipients.

Both the sender address 220 and the recipient address 230 share a common address format, which includes a username (250) and a domain name (260). In the SMTP message format, the symbol "@" separates the username 250 and the domain name 260, but other separators are possible, as are other orderings of address components.

Using a mail client, such as the mail client 120A1, a user can view the received e-mail messages 200 and compose e-mail messages for sending. As disclosed herein, a mail client, such as the mail client 120A1, may use different visual cues when displaying the recipient addresses 230, so that trusted recipients can be distinguished visually from suspect recipients. For example, differentiation between suspect and trusted categories can use different fonts or font attributes, or icons, or position within the recipient list. The classification into suspect and trusted categories can be based on recipient address, or on additional information about the recipient that is available to a mail client, such as the mail client 120A1.

As described above, a mail server, such as mail server 110A, handles e-mail messages sent to, and received from, an e-mail address which includes the domain served by the mail server. A mail client using a particular e-mail address is therefore associated, through the mail server, with a particular domain. This domain will be referred to as the mail client's "assigned" domain. According to exemplary embodiments, trusted recipients include those recipients who are associated with the mail client's assigned domain, and suspect recipients include those recipients not associated with the mail client's assigned domain. According to other exemplary embodiments, a user can specify another domain, other than his assigned domain, and recipients who are associated with this specified domain are also considered trusted; recipients who are not associated with the client's assigned domain or the client's specified domain are considered suspect.

Figure 3A:
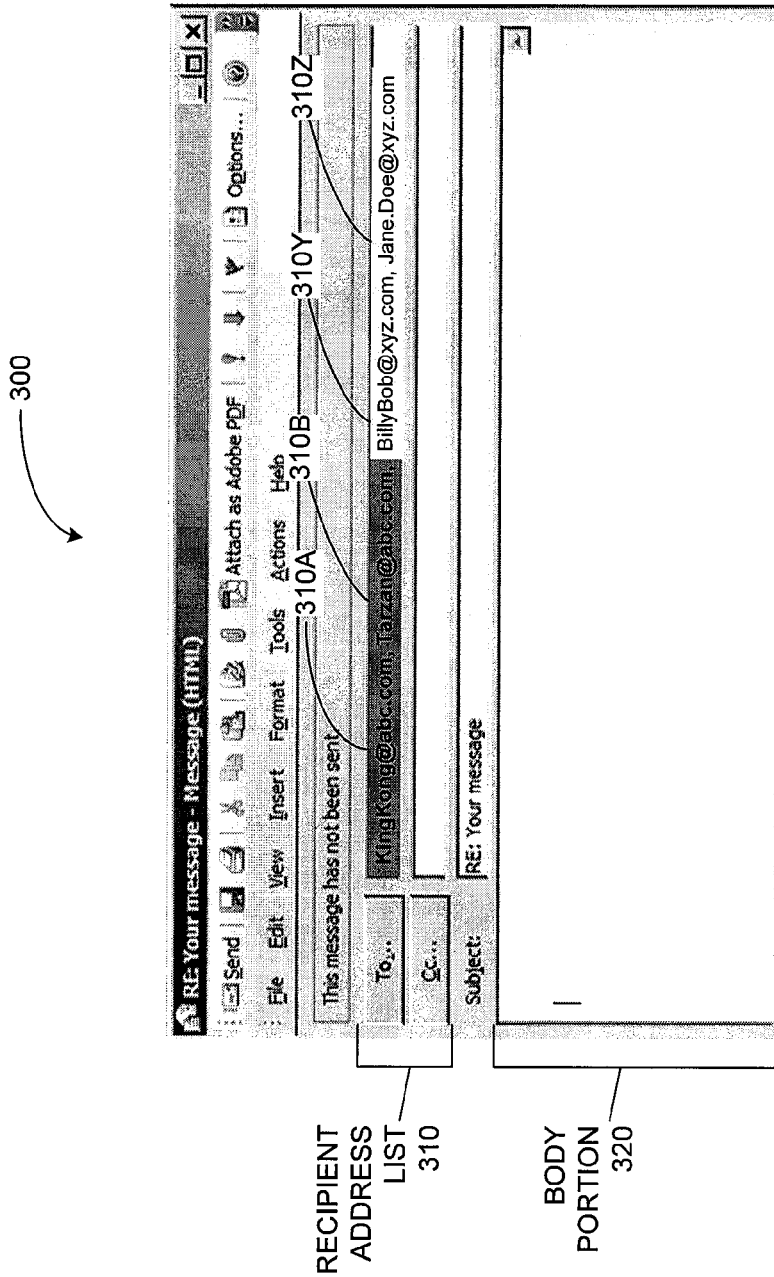
FIGS. 3A-E illustrate embodiments of an e-mail message window presented by the mail client of FIG. 1.
Figure 3B:
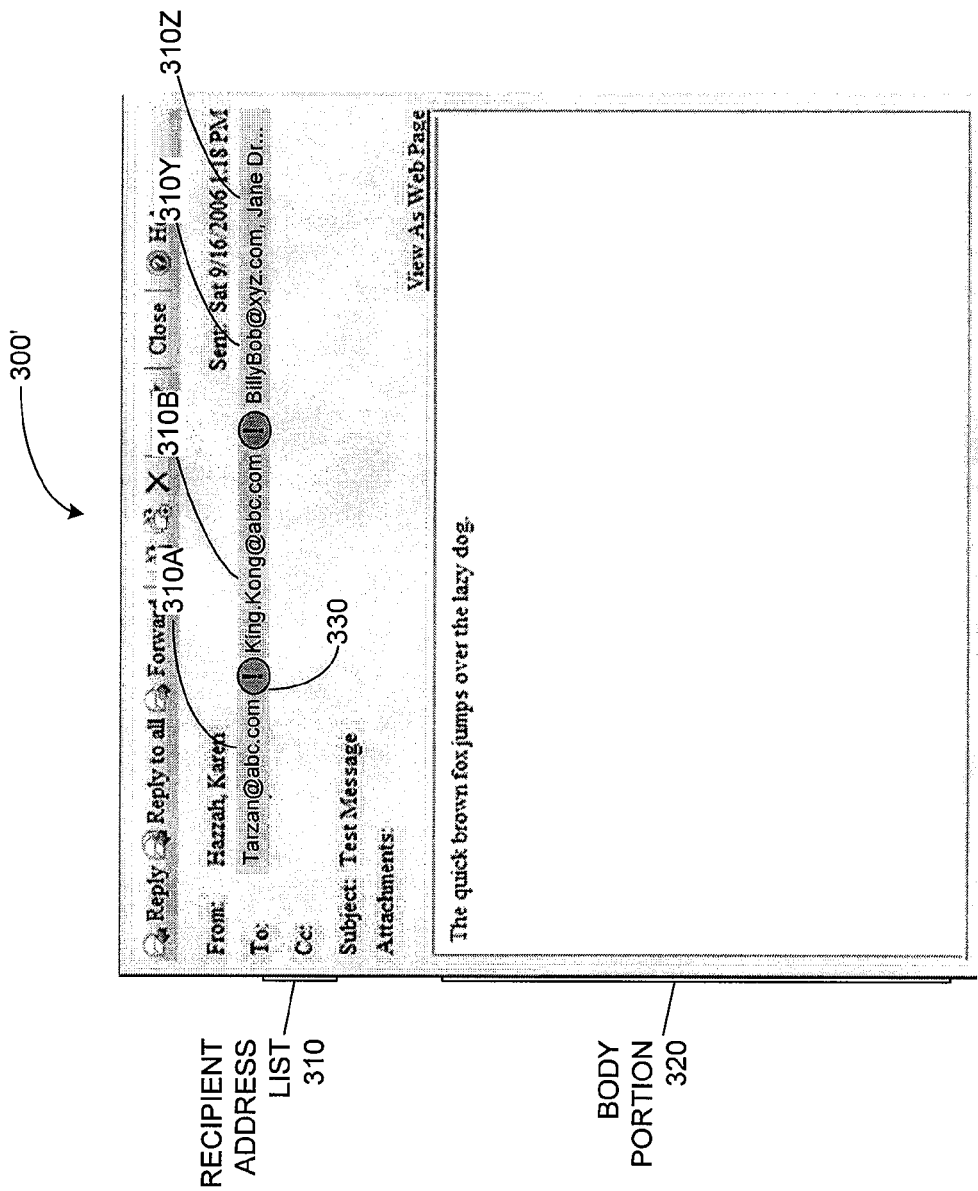

Several examples of visual cues for suspect/trusted differentiation will be described next, while examples of classification criteria will be discussed in further detail in connection with FIGS. 4 and 5. FIGS. 3A and 3B illustrate several embodiments of an e-mail message window presented by a mail client, such as the mail client 120A1. In each figure, a window 300 displays a single e-mail message. The window 300 includes a recipient address list portion 310, and a body portion 320. As can be seen in FIGS. 3A and 3B, a mail client, such as the mail client 120A1, typically presents an e-mail message in a user-friendly format, so there is typically not a one-to-one correspondence between the actual message in SMTP format (200) and the message as displayed (300 and 300'). For example, the window 300 does not show include routing information 210.

In the embodiment of FIG. 3A, trusted addresses (310Y, Z) are displayed with one visual appearance, while suspect addresses (310A, B) have another visual appearance. In this example, the visual appearance of suspect addresses includes highlighting and bold font, and the visual appearance of trusted addresses is the normal address font. Visual appearance may include a number of options, including, but not limited to, font, font size, font color, font attribute (e.g., underline, italics, bold), and background color (i.e., highlighting). A person of ordinary skill in the art should recognize that these and other options can be used in various combinations to achieve different visual appearances.

The embodiment of FIG. 3A also uses position as a visual cue: the suspect addresses (310A, B) appear before the trusted addresses (310Y, Z) in the list of addresses. This ordering is particularly useful in a relatively long list when a user must scroll down to see the list members at the end of the list, as is the case in FIG. 3A. Although the embodiment of FIG. 3A uses two visual cues (appearance and list position) to differentiate suspect and trusted addresses, another embodiment uses the visual appearance cue without the list position cue, and yet another embodiment uses the list position cue without the visual appearance cue.

The window 300 in FIG. 3A is displayed when composing a new message, either as a reply to a received message or as a new message unrelated to a received message. The visual cue for trusted/suspect addresses, as described herein, is useful in both of these contexts. When composing a reply, particularly a "Reply to All", the sender often does not pay close attention to the identity of the recipients. Similarly, a sender of a new and unrelated message (i.e., not a reply) may not be aware of the trusted/suspect classification of a recipient, even when the recipients are picked from a list of contacts or an address book. For example, the name picked by the sender may be a "friendly name" (e.g., "Brother John") which does not include the domain name that would indicate to the sender the trusted/suspect classification. Also, the method used by some mail clients to add a new sender to the address book prevents the recipient from seeing the domain name of such a sender. In these cases, as well as others, the visual cue used by a mail client, such as mail client 120A1, when displaying addresses alerts the sender to suspect recipients.

One scenario in which this information is particularly useful occurs when the user works for a company and the message contains information which should not be shared outside the company. In another embodiment, a warning message is displayed when the user attempts to send a message which contains recipients who are in a different domain than the user.

When composing a reply message, the recipient list 310 is initially filled with the address of the sender, or the addresses of all recipients, depending on whether the message is a "Reply" (to Sender) or a "Reply to All". In this case, the distinguishing visual appearance and/or position is applied to the initialized list when the window appears. Furthermore, as a user changes the contents of the recipient list 310, for example, by adding or deleting recipients, the distinguishing visual cue is applied to the modified list. In the case of a new message, the recipient list 310 is initially empty, so distinguishing visual cue is applied as the user adds or deletes recipients.

The window 300' in FIG. 3B is displayed when viewing an already-received message. Here, the recipient list 310 is static, so the distinguishing visual cue is applied when the window appears. In this embodiment, the visual cue for distinguishing suspect addresses is an icon (330) displayed after each suspect address (in this example, the addresses 310A and 310B), and trusted addresses (in this example, the addresses 310X and 310Y) do not display an icon. Another embodiment uses a second (different) icon for trusted addresses.

In this example window 300', the list of recipients is longer than the display area: only a portion of right-most address is displayed, with ellipses indicating that the rest is missing. In this embodiment, in addition to the icon indicating suspect status, suspect recipients are identified with another visual clue: list position. Specifically, suspect recipients appear before trusted recipients in the "To" list. (Conventional mail clients typically display recipients in alphabetical order or in the order the recipients were added to the list.) Therefore, even if the display area is not large enough to show all recipients, a user can quickly see which recipients are suspect, without having to bring up a separate recipient list window which displays all recipients.

Figure 3C:
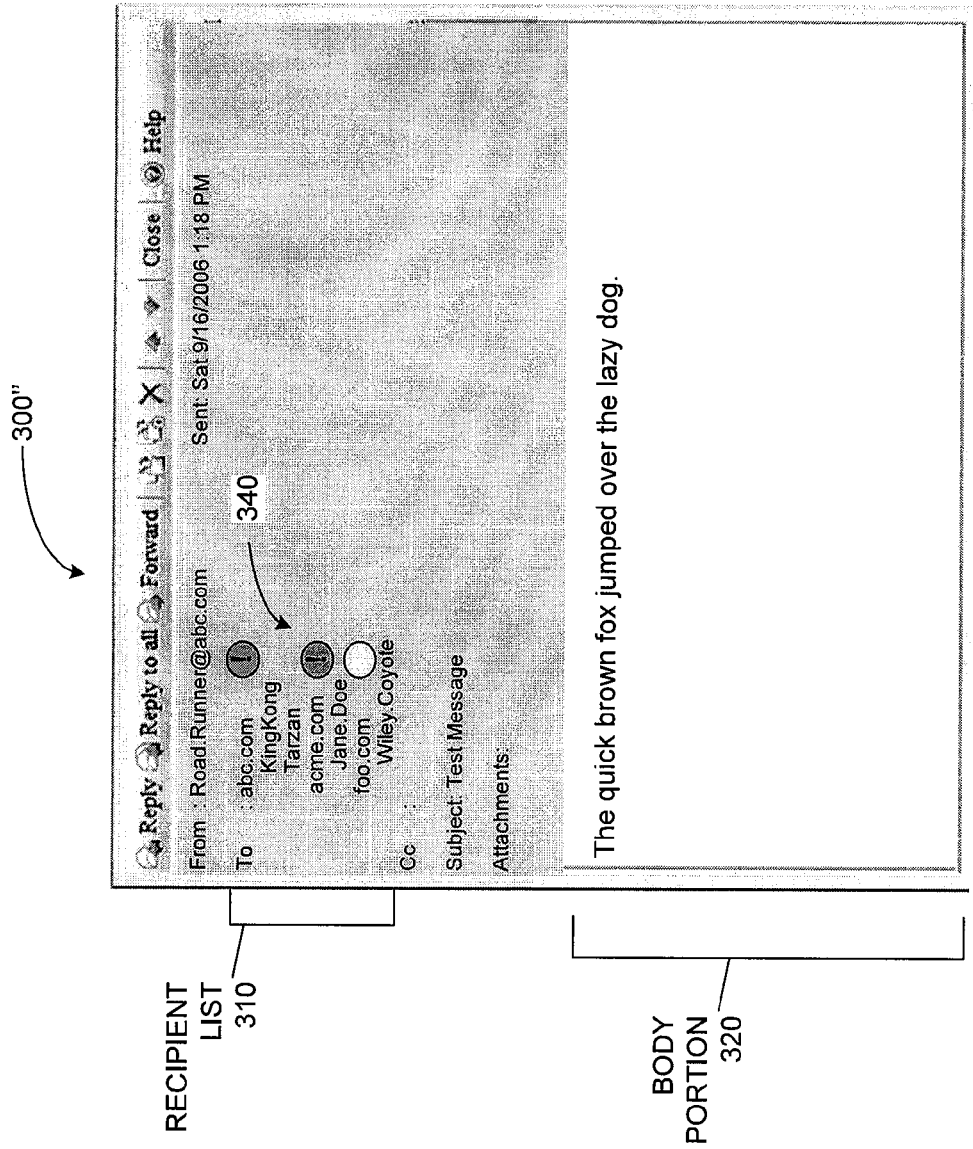

FIG. 3C is another embodiment of a window 300'' displayed when viewing an already-received message. In this embodiment, the recipient list 310 is displayed in a domain name hierarchy (340). That is, all recipients from the same domain are displayed together and indented under the appropriate domain name. In the example window 300''', two visual cues are used to indicate suspect or trusted. As a first visual cue, each suspect domain name has a "suspect" icon and each trusted domain name has a "trusted" icon. As a second visual cue, suspect domains are displayed first, followed by trusted domains.

Figure 3D:
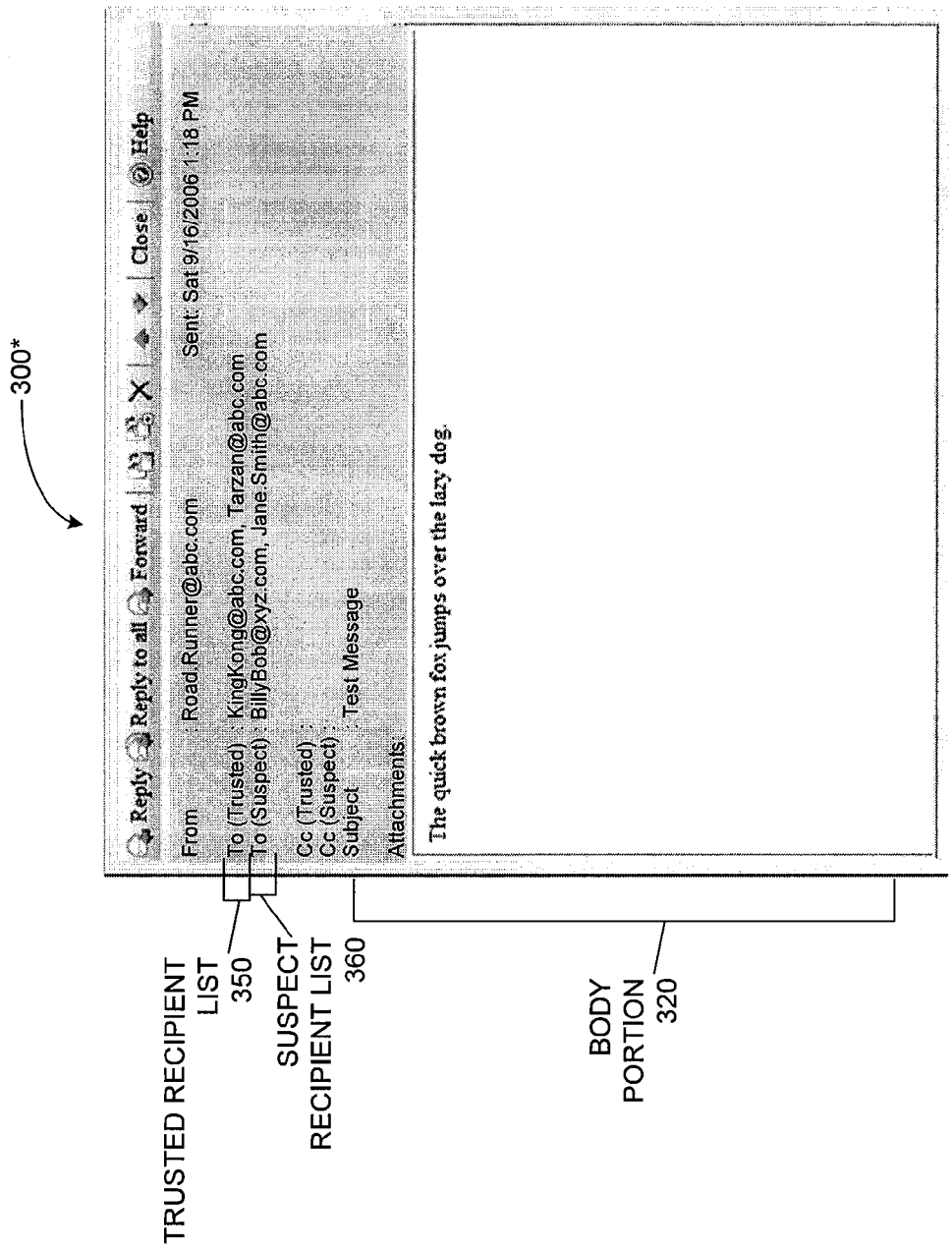

FIG. 3D is another embodiment of a window 300*  displayed when viewing an already-received message. This embodiment includes two recipient lists, one list (350) showing trusted recipients and the other list (360) showing suspect recipients. Thus, the visual cue for classification is position within the addresses window 300*, rather than position within the single recipient list, as in the addresses window 300' of FIG. 3B.

Figure 3E:
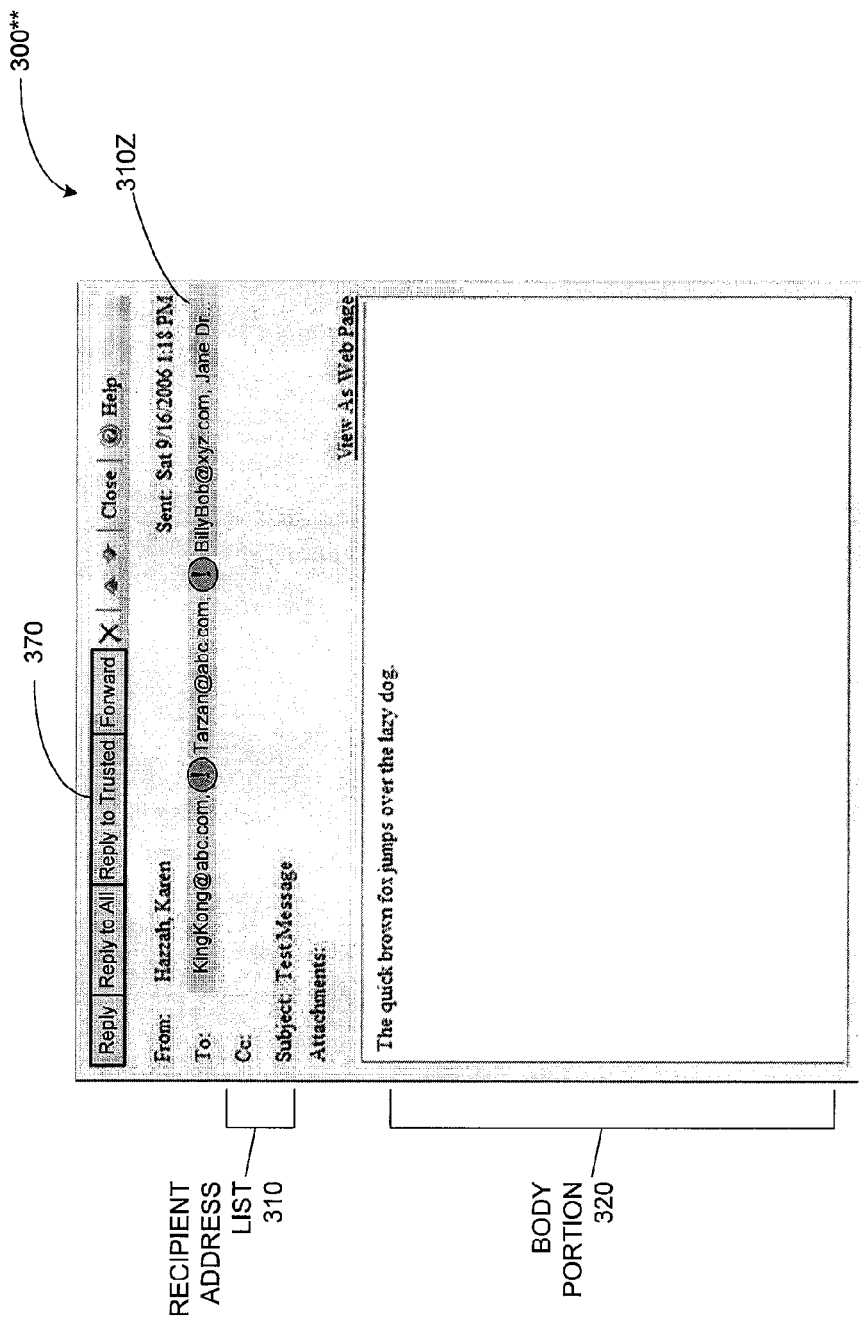

FIG. 3E is another embodiment of a window 300 displayed when viewing an already-received message. This embodiment includes a Reply to Trusted option (370) which allows a user to quickly reply to only those recipients classified as trusted. Activating the Reply to Trusted option 370 may bring up a window for composing a new message, in which the recipient list is pre-populated with trusted recipients of the associated received message. Thus, the Reply to Trusted option 370** is similar in action to a Reply to All option (not shown), which should be familiar to a person of ordinary skill in the art.

Figure 4:
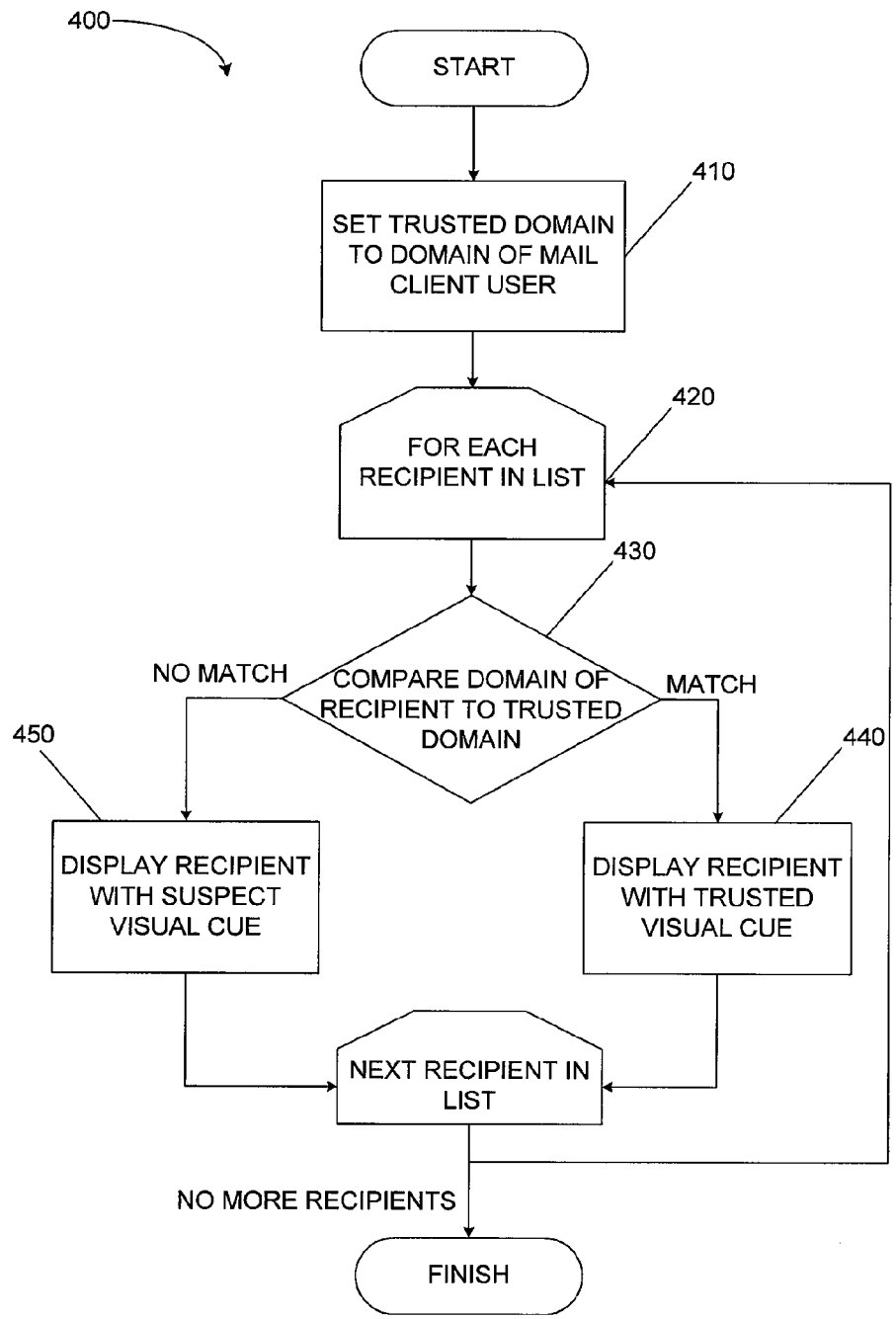
FIG. 4 is a flowchart of one embodiment of a process which the mail client of FIG. 1 uses to determine which visual cue to use when displaying addresses.

FIG. 4 is a flowchart of one embodiment of a process 400 which a mail client, such as the mail client 120A1, uses to determine which visual cue to use when displaying addresses in a window, such as window 300. This embodiment uses information in the message itself (200), and therefore can execute on a mail client, such as the mail client 120A1, without interaction with mail server, such as the mail server 110. This embodiment does not use the address database 160.

The process 400 starts at block 410, where the trusted domain is set to the domain of the user running a mail client, such as the mail client 120A1. Next, block 420 begins an iteration loop applied for each entry in the recipient list (310 in FIGS. 3A,B) of the message to be displayed. Block 430 compares the domain of the current recipient to the trusted domain. If a match is found, then the recipient is classified as trusted, and block 440 displays the current recipient with a visual cue that is associated with trusted addresses. If no match is found, then the recipient is classified as suspect, and block 450 displays the current recipient with a visual cue that is associated with suspect addresses.

Exemplary visual cues were discussed earlier in connection with FIGS. 3A and 3B. A person of ordinary skill in the art should understand the hierarchical nature of Internet domains, and how this hierarchy is taken into account when comparing domains. For example, support.foo.com is a lower-level domain included within the foo.com domain, and these two domains are therefore considered a match by the process 400 even though the text strings are not an exact match.

After the current recipient is displayed with the appropriate visual cue, processing continues at the block 430 with the next loop iteration for the next recipient in the recipient list 310. When all recipients in the list 310 have been processed, the process 400 terminates.

Figure 5:
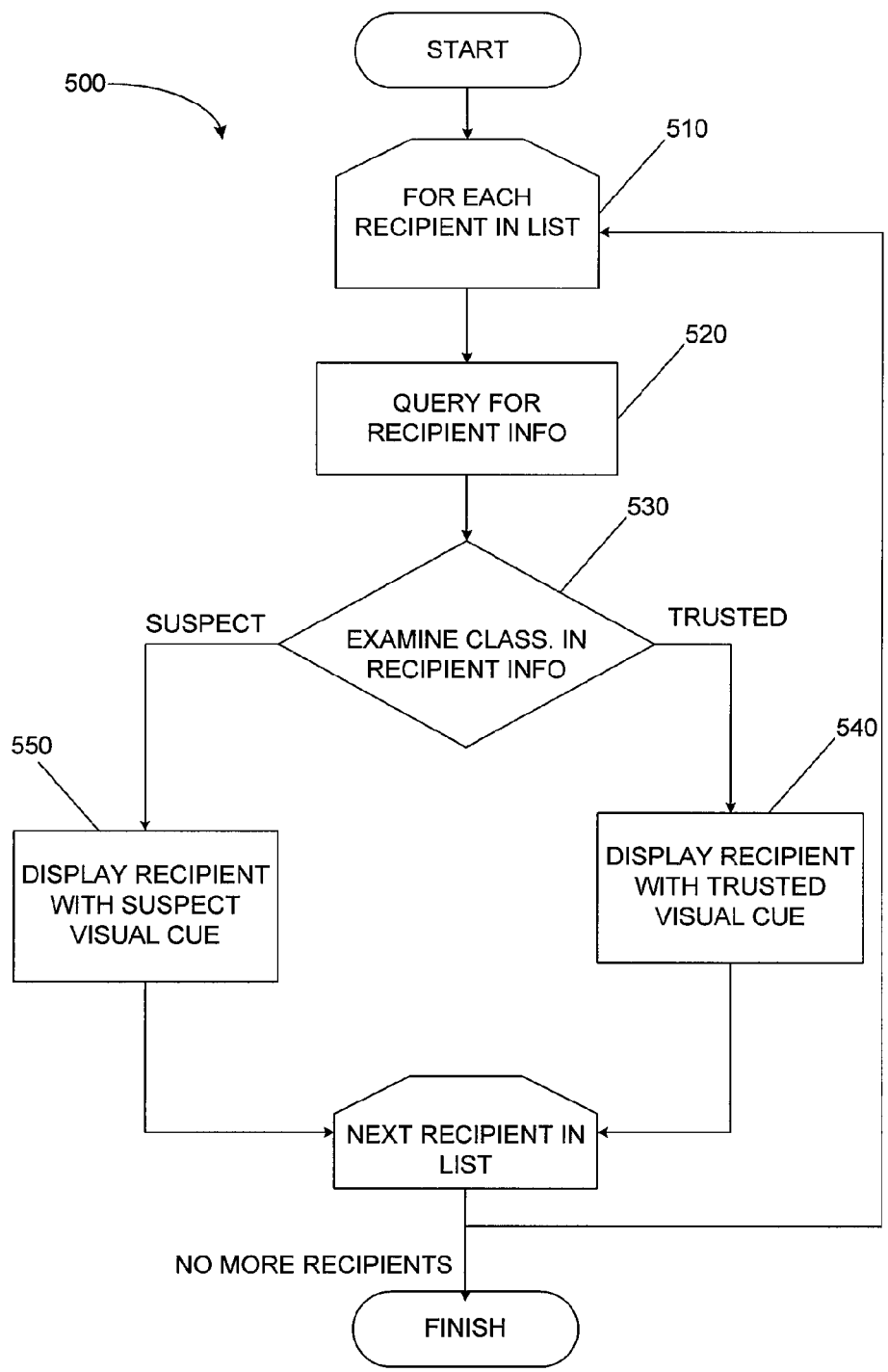
FIG. 5 is a flowchart of another embodiment of a process which mail client of FIG. 1 uses to determine which visual cue to use when displaying addresses.

FIG. 5 is a flowchart of another embodiment of a process 500 which a mail client, such as the mail client 120A1, uses to determine which visual cue to use when displaying addresses in a window, such as window 300. This embodiment uses the address database 160, which may reside in a mail client, such as the mail client 120A1, or may reside in a mail server, such as the mail server 110 (see FIG. 1).

The process 500 starts at block 510, which begins an iteration loop applied for each entry in the recipient list (310 in FIGS. 3A,B) of the message to be displayed. At block 520, the address database 160 is queried for information associated with the current recipient, which includes a classification of the current recipient as trusted or suspect. Next, at block 530, the classification is tested. If the current recipient is trusted, block 540 displays the current recipient with a visual cue that is associated with trusted addresses. If the current recipient is suspect, block 550 displays the current recipient with a visual cue that is associated with suspect addresses. (Exemplary visual cues were discussed earlier in connection with FIGS. 3A and 3B.)

FIG. 6A is a schema diagram of one embodiment of the address database 160, as used by the process 400. Exemplary address database 160 includes fields for username (610), domain (620), and classification (630). The address database 160 may also include any number of address entries. According to an exemplary embodiment, the address database 160 includes three address entries: entry 640; entry 650; and entry 660.

A recipient query of the address database 160 to determine classification includes a username and domain, and returns the classification of the matching database entry. When the username field 610 for a particular entry is a wildcard symbol (e.g. an asterisk), the username portion of the recipient is ignored, and only the domain is used for a match. Thus, a query of this exemplary database to determine the classification of the recipient with address "Tarzan@foo.com" would match the first entry 640, and return with a classification of trusted.

When the username field 610 for a particular entry is specified (i.e., not a wildcard), then the username and the domain of the recipient are used for a match. A query of this exemplary database to determine the classification of the recipient "Jane.Doe@foo.com" would match the third entry 660, and return with a classification of suspect. Note that the more specific match for a particular username takes precedence of a wildcard match, so that "Jane@foo.com" matches the third entry 660 and not the first entry 640.

The domain field 620 may includes a subdomain, as in the case of the second entry 650, which has a domain of "support.foo.com." In this case, the domain hierarchy is taken into account when querying the address database 160. Thus, a query of this exemplary database to determine the classification of the recipient address "Tarzan@foo.com" would not match the second entry 650. However, a query to determine classification of either "Tarzan@support.foo.com" or "Tarzan@technical.support.foo.com" would match the second entry 650, returning with a classification of suspect.

In one embodiment, if there is no matching database entry for a particular recipient query, the mail client, such as the mail client 120A1, treats the recipient as trusted. In another embodiment, a no-match situation is treated as suspect. In yet another embodiment, a notification is provided to the user that a particular recipient does not match any database entry, and the user has an option to include recipient in the trusted list of the or suspect list. A person of ordinary skill in the art should appreciate how a particular enterprise might choose one behavior over another, depending on preference or need.

A person of ordinary skill in the art should understand that the schema shown in FIG. 6 is one way of many to achieve the classification behavior described herein, and many other schemas are possible. Such a person should also understand how different combinations of schemas and queries can be used to achieve the wildcard, precedence, and hierarchical subdomain behaviors described herein.

FIG. 6B is a schema diagram of another embodiment of the address database 160, as used by process 500. This database includes the same fields as the database of FIG. 6A, but also includes an employee status field (670), which may be used as follows. According to exemplary embodiments, a recipient query includes a username, domain, and an employee status. If the employee status field 670 for a particular entry is specified, then employee status information of the recipient is used when determining a match. Thus, a query to determine classification of "joe.smith@foo.com/Contractor" would match the first entry 680 and return a classification of suspect. Similarly, "bob.roberts@foo.com/Employee" would match the second entry 690 and return a classification of trusted.

The employee status field 670 is only one example of using information other than e-mail address (username and/or domain) to perform classification into trusted or suspect. One enterprise may find it useful to treat employees as trusted but contractors as suspect, as in the example of FIG. 6B. However, any information which makes sense in a particular enterprise for discriminating between trusted and suspect is considered to be within the scope of the embodiments described herein. As another example, an enterprise may find it useful to discriminate based on the geographic location of the recipient's business address. As yet another example, it may be useful to discriminate based on the recipient's position within the corporate hierarchy, so that a user is made aware that the recipient list includes the president of the company.

The embodiments described above use a binary classification process (trusted or suspect). Other embodiments are not restricted to binary, and classify into levels of trust. As one example, a company may rank full-time employees as fully trusted (High), contractors as somewhat trusted (Medium) and external recipients as suspect (Low). Trust levels may be communicated to the mail client user through a visual indication or cue. This cue reminds the message sender to check that message content is appropriate for the trust level of the recipients, or to delete inappropriate recipients. In one embodiment, different font colors are used to distinguish recipients with different trust levels (e.g., green for High, orange for Medium, red for Low). In another embodiment, other font characteristics such as bold and italic are used to distinguish between trust levels (e.g., normal for High, italics for Medium, bold for Low). In yet another embodiment, both font color and normal/bold/italic characteristics are used to distinguish between trust levels.

In the examples above, data which is used to classify a recipient into trusted, suspect, or somewhere in between is stored in a database. A person of ordinary skill in the art should understand that the process of using this data to classify recipients can be performed by the user, using a manual or semi-automated process. That is, the user may specifically indicate the classification of a recipient, for example, the first time a message from that recipient is received. In another embodiment, a system administrator performs the classification, and the classification information is "pushed" to mail clients. In yet another embodiment, a system administrator performs the classification, producing a database which is then used by the mail server or mail clients to query the classification status of a recipient.

Figure 7:
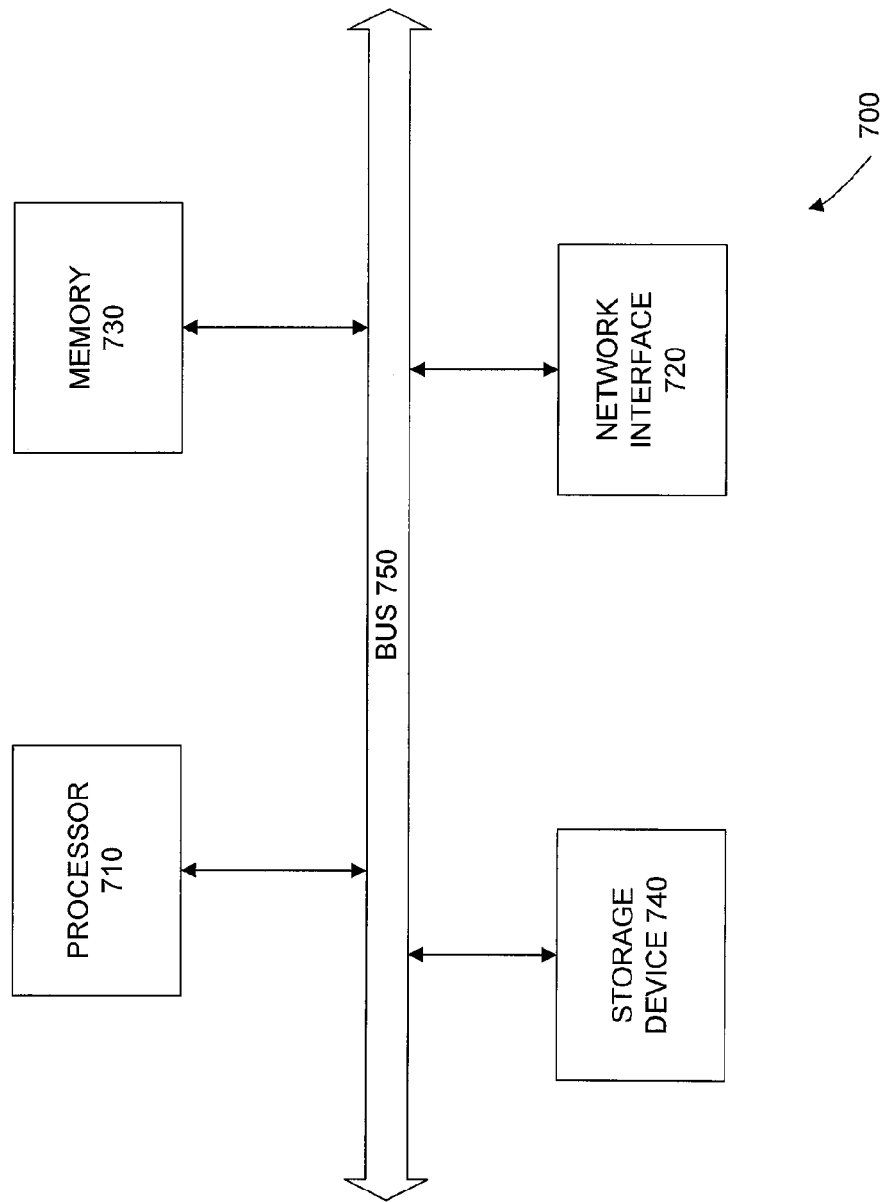

FIG. 7 is a hardware block diagram of a general-purpose computer 700 which can be used to implement various embodiments of the mail client, such as the mail client 120A1. Computer 700 contains a number of components that are well known in the art of contact center software, including a processor 710, a network interface 720, memory 730, and storage device 740. Examples of storage device 740 include, for example, a hard disk, flash RAM, flash ROM, and EEPROM. These components are coupled via a bus 750. Memory 730 contains instructions which, when executed by the processor 710, implement a systems and methods for displaying electronic mail messages, such as the processes depicted in the diagrams of FIGS. 4-5. Omitted from FIG. 7 are a number of conventional components that are unnecessary to explain the operation of computer 700.

The systems and methods for displaying electronic mail messages disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to): an optical fiber; and a portable compact disk read-only memory (CD-ROM). In addition, the functionality could be implemented in logic embodied in hardware or software-configured media.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What we claim is:

1. An apparatus for displaying an e-mail message having a plurality of recipients, the apparatus comprising:
   a processor; and
   a memory to store computer program instructions, the computer program instructions when executed on the processor cause the processor to perform operations comprising:
   setting a domain of a sender as an assigned domain;
   classifying each recipient of a plurality of recipients specified by an e-mail message to be sent by the sender, as one of trusted and suspect based on a domain of each recipient of the plurality of recipients matching the assigned domain and recipient information stored in a contact database, wherein the recipient information for each recipient of the plurality of recipients is compared against database entries associated with a suspect classification, wherein the recipient information includes an employee status, a geographic location of a business of a recipient, and a position of a recipient in a corporate hierarchy, wherein a particular combination of recipient information that causes a particular recipient to be considered as one of trusted and suspect is customizable by a user and wherein the database entries associated with the suspect classification comprise a particular geographic location and a particular position level within the corporate hierarchy;
   presenting, for display, a specific recipient of the plurality of recipients using a first visual cue if the specific recipient of the plurality of recipients is classified as suspect;
   presenting, for display, the specific recipient of the plurality of recipients using a second visual cue if the specific recipient of the plurality of recipients is classified as trusted;
   reordering the plurality of recipients within a recipient list of the e-mail message and displaying a recipient list that has been reordered showing all recipients classified as being trusted before all recipients classified as being suspect within the recipient list;
   presenting, for display, a notification that a first recipient of the plurality of recipients is missing recipient information that allows the first recipient of the plurality of recipients to be classified as one of trusted and suspect and displaying a prompt for the user to designate the first recipient of the plurality of recipients as being one of trusted and suspect; and
   providing a reply to trusted option to compose an e-mail message addressed to only a subset of the recipients classified as being trusted when selected.

2. The apparatus of claim 1, wherein each recipient of the plurality of recipients comprises an e-mail address, and wherein classifying each recipient of the plurality of recipients further comprises:
   classifying each recipient of the plurality of recipients as one of trusted and suspect based on a respective recipient e-mail address.

3. The apparatus of claim 1, wherein each recipient of the plurality of recipients comprises an e-mail address having a domain name and a username, wherein classifying each recipient of the plurality of recipients further comprises:
   comparing the domain name of each recipient of the plurality of recipients e-mail address with domain names in the contact database; and
   classifying each recipient of the plurality of recipients as one of trusted and suspect based on a match between each recipient of the plurality of recipients e-mail address and the domain names.

4. The apparatus of claim 1, wherein each recipient of the plurality of recipients comprises an e-mail address having a domain name and a username, wherein classifying each recipient of the plurality of recipients further comprises:
   comparing the username of each recipient of the plurality of recipients e-mail address with usernames in the contact database; and
   classifying each recipient of the plurality of recipients as one of trusted and suspect based on a match between each recipient of the plurality of recipients e-mail address and the usernames.

5. The apparatus of claim 1, wherein the presenting a specific recipient of the plurality of recipients using a first visual cue further comprises:
   displaying the e-mail message in a message display window; and
   displaying the specific recipient of the plurality of recipients using the first visual clue in the message display window.

6. A method of displaying an e-mail message, the method comprising:
   setting a domain of a sender as an assigned domain;
   classifying, by a computer processor, each recipient of a plurality of recipients specified by an e-mail message to be sent by the sender, as one of trusted and suspect based on a domain of each recipient of the plurality of recipients matching the assigned domain and recipient information stored in a contact database, wherein the recipient information for each recipient of the plurality of recipients is compared against database entries associated with a suspect classification, wherein the recipient information includes an employee status, a geographic location of a business of a recipient, and a position of a recipient in a corporate hierarchy, wherein a particular combination of recipient information that causes a particular recipient to be considered as one of trusted and suspect is customizable by a user and wherein the database entries associated with the suspect classification comprise a particular geographic location and a particular position level within the corporate hierarchy;

presenting, for display, a specific recipient of the plurality of recipients using a first visual cue if the specific recipient of the plurality of recipients is classified as suspect;

presenting, for display, the specific recipient of the plurality of recipients using a second visual cue if the specific recipient of the plurality of recipients is classified as trusted;

reordering, by the computer processor, the plurality of recipients within a recipient list of the e-mail message and displaying a recipient list that has been reordered to show all recipients classified as being trusted before all recipients classified as being suspect within the recipient list;

presenting, for display, a notification that a first recipient of the plurality of recipients is missing recipient information that allows the first recipient of the plurality of recipients to be classified as one of trusted and suspect and displaying a prompt for the user to designate the first recipient of the plurality of recipients as being one of trusted and suspect; and providing a reply to trusted option to compose an e-mail message addressed to only a subset of the recipients classified as being trusted when selected.

7. The method of claim 6, wherein each recipient of the plurality of recipients comprises an e-mail address, and wherein classifying each recipient of the plurality of recipients further comprises:

classifying each recipient of the plurality of recipients as one of trusted and suspect based on a respective recipient e-mail address.

8. The method of claim 6, wherein each recipient of the plurality of recipients comprises an e-mail address having a domain name and a username, wherein classifying each recipient of the plurality of recipients further comprises:

comparing the domain name of each recipient of the plurality of recipients e-mail address with domain names in the contact database; and classifying each recipient of the plurality of recipients as one of trusted and suspect based on a match between each recipient of the plurality of recipients e-mail address and the domain names.

9. The method of claim 6, wherein each recipient of the plurality of recipients comprises an e-mail address having a domain name and a username, wherein classifying each recipient of the plurality of recipients further comprises:

comparing the username of each recipient of the plurality of recipients e-mail address with usernames in the contact database; and classifying each recipient of the plurality of recipients as one of trusted and suspect based on a match between each recipient of the plurality of recipients e-mail address and the usernames.

10. The method of claim 6, wherein the presenting a specific recipient of the plurality of recipients using a first visual cue further comprises:

displaying the e-mail message in a message display window; and displaying the specific recipient of the plurality of recipients using the first visual clue in the message display window.

11. The method of claim 6, wherein each of the plurality of recipients is associated with an e-mail address, and the presenting a specific recipient of the plurality of recipients using a first visual cue further comprises:

displaying the e-mail message in a message display window; and displaying, in the message display window, the recipients in a hierarchy according to a domain name in an associated e-mail address of each recipient.

12. A non-transitory computer-readable storage medium storing computer program instructions for displaying an e-mail message, which, when executed on a processor, cause the processor to perform operations comprising:

setting a domain of a sender as an assigned domain;

classifying each recipient of a plurality of recipients specified by an e-mail message to be sent by the sender, as one of trusted and suspect based on a domain of each recipient of the plurality of recipients matching the assigned domain and recipient information stored in a contact database, wherein the recipient information for each recipient of the plurality of recipients is compared against database entries associated with a suspect classification, wherein the recipient information includes an employee status, a geographic location of a business of a recipient, and a position of a recipient in a corporate hierarchy, wherein a particular combination of recipient information that causes a particular recipient to be considered as one of trusted and suspect is customizable by a user and wherein the database entries associated with the suspect classification comprise a particular geographic location and a particular position level within the corporate hierarchy;

presenting, for display, a specific recipient using a first visual cue if the specific recipient of the plurality of recipients is classified as suspect;

presenting, for display, the specific recipient of the plurality of recipients using a second visual cue if the specific recipient of the plurality of recipients is classified as trusted;

reordering the plurality of recipients within a recipient list of the e-mail message and displaying a recipient list that has been reordered to show all recipients classified as being trusted before all of the recipients classified as being suspect within the recipient list;

presenting, for display, a notification that a first recipient of the plurality of recipients is missing recipient information that allows the first recipient of the plurality of recipients to be classified as one of trusted and suspect and displaying a prompt for the user to designate the first recipient of the plurality of recipients as being one of trusted and suspect; and providing a reply to trusted option to compose an e-mail message addressed to only a subset of the recipients classified as being trusted when selected.

13. The non-transitory computer-readable storage medium of claim 12, wherein each recipient of the plurality of recipients comprises an e-mail address, and wherein classifying each recipient of the plurality of recipients further comprises:
classifying each recipient of the plurality of recipients as one of trusted and suspect based on a respective recipient e-mail address.

14. The non-transitory computer-readable storage medium of claim 12, wherein each recipient of the plurality of recipients comprises an e-mail address having a domain name and a username, wherein classifying each recipient of the plurality of recipients further comprises:
comparing the domain name of each recipient of the plurality of recipients e-mail address with domain names in the contact database; and
classifying each recipient of the plurality of recipients as one of trusted and suspect based on a match between each recipient of the plurality of recipients e-mail address and the domain names.

15. The non-transitory computer-readable storage medium of claim 12, wherein each recipient of the plurality of recipients comprises an e-mail address having a domain name and a username, wherein classifying each recipient of the plurality of recipients further comprises:
comparing the username of each recipient of the plurality of recipients e-mail address with usernames in the contact database; and
classifying each recipient of the plurality of recipients as one of trusted and suspect based on a match between each recipient of the plurality of recipients e-mail address and the usernames.

16. The non-transitory computer-readable storage medium of claim 12, wherein the presenting a specific recipient of the plurality of recipients using a first visual cue further comprises:
displaying the e-mail message in a message display window; and
displaying the specific recipient of the plurality of recipients using the first visual clue in the message display window.

17. The non-transitory computer-readable storage medium of claim 16, further comprising displaying the specific recipient with a first icon if the classification is suspect and a second icon if the classification is trusted.

18. The non-transitory computer-readable storage medium of claim 12, wherein each of the plurality of recipients is associated with an e-mail address, and presenting the recipient using a first visual cue further comprises:
displaying the e-mail message in a message display window; and
displaying, in the message display window, the recipient list in a hierarchy according to a domain name in an associated e-mail address of each recipient.

* * * * *